United States Patent
Tong

(10) Patent No.: US 9,658,611 B2
(45) Date of Patent: May 23, 2017

(54) MACHINE TOOL INCLUDING NUMERICAL CONTROLLER WITH FUNCTION TO DETERMINE REPLACEMENT TIME FOR MAINTENANCE COMPONENT

(71) Applicant: FANUC Corporation, Minamitsuru-gun, Yamanashi (JP)

(72) Inventor: Zheng Tong, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 602 days.

(21) Appl. No.: 14/094,650

(22) Filed: Dec. 2, 2013

(65) Prior Publication Data

US 2014/0156057 A1    Jun. 5, 2014

(30) Foreign Application Priority Data

Dec. 4, 2012    (JP) .................................. 2012-265596

(51) Int. Cl.
*G05B 19/4065*    (2006.01)

(52) U.S. Cl.
CPC .............. *G05B 19/4065* (2013.01); *G05B 2219/37214* (2013.01); *G05B 2219/40009* (2013.01); *G05B 2219/50185* (2013.01)

(58) Field of Classification Search
CPC ...... G05B 19/4065; G05B 2219/37214; G05B 2219/50185; G05B 2219/40009
See application file for complete search history.

(56) References Cited

U.S. PATENT DOCUMENTS

| 4,351,029 A * | 9/1982 | Maxey ................. G01N 3/58 |
|  |  | 340/680 |
| 6,263,454 B1 | 7/2001 | Gold et al. |
| 6,615,103 B2 * | 9/2003 | Fujishima .......... B23Q 41/08 |
|  |  | 318/566 |
| 6,665,580 B1 | 12/2003 | Susnjara |

(Continued)

FOREIGN PATENT DOCUMENTS

| CN | 201383093 Y | 1/2010 |
| DE | 69627842 T2 | 5/2004 |
| JP | 63-174105 A | 7/1988 |

(Continued)

OTHER PUBLICATIONS

Office Action mailed Nov. 11, 2014, corresponding to Japanese patent application No. 2012-265596.

(Continued)

*Primary Examiner* — Carlos Ortiz Rodriguez
(74) *Attorney, Agent, or Firm* — Hauptman Ham, LLP

(57) ABSTRACT

A controller for a machine tool outputs an operation instruction signal to the machine tool. The machine tool transmits a signal indicating that the instructed operation is compete. The controller determines a response time of operation to be a difference in time between a point in time when the numerical controller outputs an operation instruction signal and a point in time when the numerical controller receives a signal from the machine tool. When the response time of operation exceeds a preset value, the numerical controller determines that a corresponding maintenance component needs to be replaced and informs a user of the need for replacement by means of a display unit.

7 Claims, 10 Drawing Sheets

(56) References Cited

U.S. PATENT DOCUMENTS

2004/0193307 A1 9/2004 Fujishima et al.
2013/0132000 A1 5/2013 Tamaki

FOREIGN PATENT DOCUMENTS

| JP | H05101245 A | 4/1993 |
| JP | 2003186508 A | 7/2003 |
| JP | 2004-295348 A | 10/2004 |
| JP | 2008-87092 A | 4/2008 |
| JP | 2011243118 A | 12/2011 |

OTHER PUBLICATIONS

Office Action mailed Jun. 3, 2014, corresponds to Japanese patent application No. 2012-265596.
Office Action in DE Application No. 102013113311.8, dated Jul. 15, 2016.

* cited by examiner

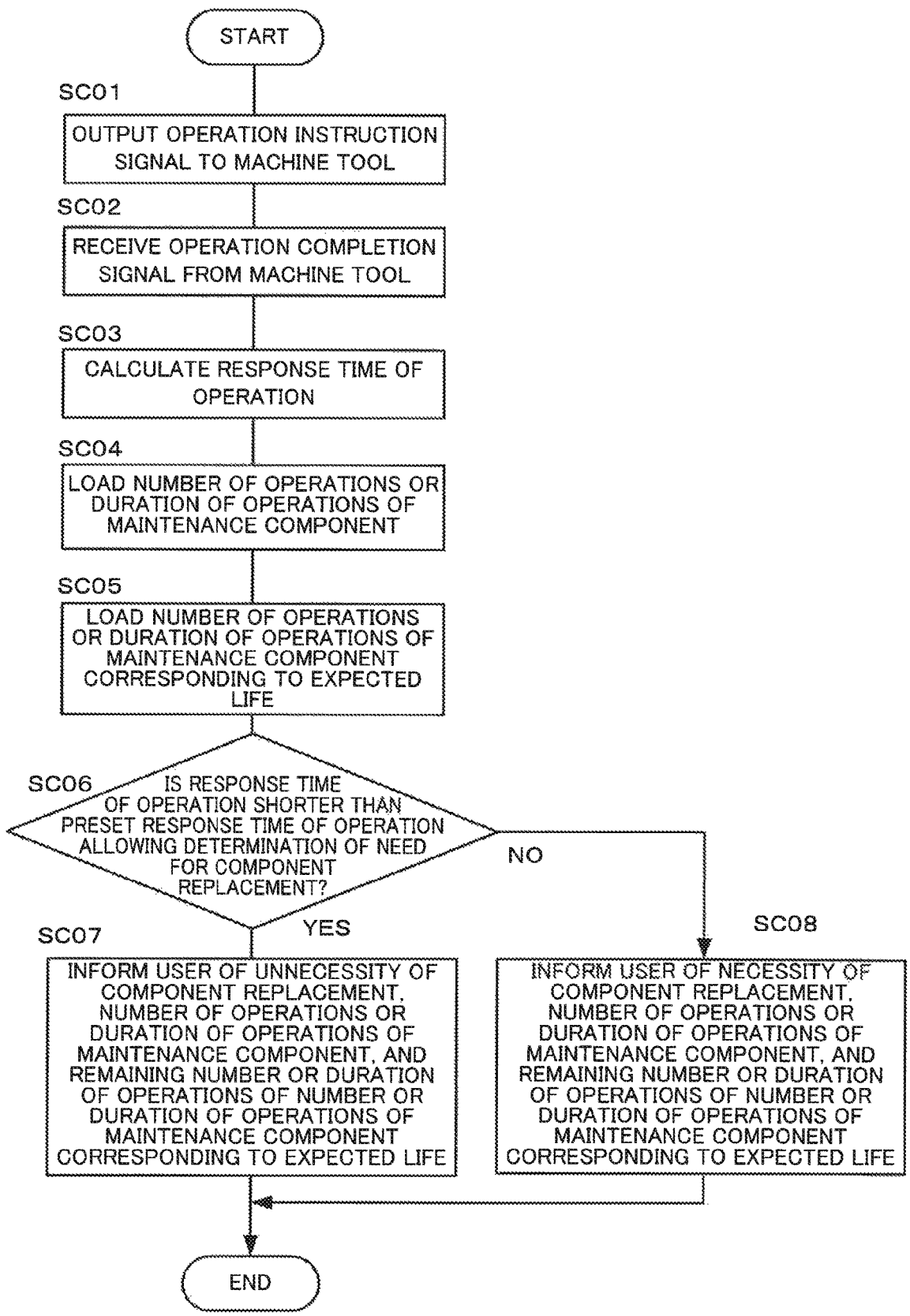

FIG.9

MAINTENANCE COMPONENT NEEDS TO BE REPLACED

MAINTENANCE COMPONENT HAS BEEN OPERATED
98,000 TIMES

MAINTENANCE COMPONENT HAS BEEN OPERATED
FOR 9,500 HOURS

FIG.10

MAINTENANCE COMPONENT NEED NOT BE REPLACED

MAINTENANCE COMPONENT HAS BEEN OPERATED
70,000 TIMES

MAINTENANCE COMPONENT CAN BE OPERATED 30,000
TIMES MORE BEFORE END OF EXPECTED LIFE

MAINTENANCE COMPONENT HAS BEEN OPERATED FOR
8,000 HOURS

MAINTENANCE COMPONENT CAN BE OPERATED FOR
2,000 HOURS MORE BEFORE END OF EXPECTED LIFE

FIG.11

MAINTENANCE COMPONENT NEEDS TO BE REPLACED

MAINTENANCE COMPONENT HAS BEEN OPERATED
98,000 TIMES

MAINTENANCE COMPONENT CAN BE OPERATED 2,000
TIMES MORE BEFORE END OF EXPECTED LIFE

MAINTENANCE COMPONENT HAS BEEN OPERATED FOR
9,500 HOURS

MAINTENANCE COMPONENT CAN BE OPERATED FOR 500
HOURS MORE BEFORE END OF EXPECTED LIFE

FIG.12A

80% OF ACTUAL LIFE HAS ELAPSED

MAINTENANCE COMPONENT HAS BEEN OPERATED
75,000 TIMES

MAINTENANCE COMPONENT HAS BEEN OPERATED
FOR 7,000 HOURS

FIG.12B

90% OF ACTUAL LIFE HAS ELAPSED

MAINTENANCE COMPONENT HAS BEEN OPERATED
85,000 TIMES

MAINTENANCE COMPONENT HAS BEEN OPERATED
FOR 8,000 HOURS

FIG.12C

MAINTENANCE COMPONENT NEEDS TO BE REPLACED

MAINTENANCE COMPONENT HAS BEEN OPERATED
98,000 TIMES

MAINTENANCE COMPONENT HAS BEEN OPERATED
FOR 9,500 HOURS

MACHINE TOOL INCLUDING NUMERICAL CONTROLLER WITH FUNCTION TO DETERMINE REPLACEMENT TIME FOR MAINTENANCE COMPONENT

RELATED APPLICATIONS

The present application claims priority to Japanese Application Number 2012-265596 filed Dec. 4, 2012, the disclosure of which is hereby incorporated by reference herein in its entirety.

BACKGROUND OF THE INVENTION

1. Field of the Invention

The present invention relates to a machine tool controlled by a numerical controller with a function to determine a replacement time for a maintenance component.

2. Description of the Related Art

The life of a machine tool is extended by appropriate maintenance work and component replacement. A controller that controls the machine tool manages times for maintenance work and component replacement for various components used in the machine tool. For example, the maximum number and duration of operations obtained by lifetime experiments during design of the machine tool are stored in advance in a storage device of the controller for the machine tool as reference values. The controller for the machine tool measures the current number and duration of operations of a component to be monitored. When the measured number and duration of operations reach the respective preset reference values, a user of the machine tool is informed that the time has come to maintain or replace the component to be monitored.

For the values of the maximum number and duration of operations for determining the life of the component used in the machine tool, margins are allowed for values obtained by lifetime experiments during design taking various usage environments for the machine tool into account. Setting the values of the maximum number and duration of operations in this manner has the advantage of allowing the life of the component to be easily managed. However, under service conditions for most machine tools, the user is requested by the controller for the machine tool to maintain or replace the component earlier than the end of the inherent life of the component. This leads to frequent maintenance work and component replacement, increasing costs.

On the other hand, when a component of the machine tool is used under a condition and an environment which fail to meet a certain specification, maintenance work or component replacement becomes necessary earlier than the expected end of life of the component, but the controller for the machine tool fails to request the user to maintain or replace the component earlier. This precludes the component from being appropriately maintained or replaced. Thus, disadvantageously, the maintenance or replacement of the component may be delayed to damage the machine tool including the component, shortening the life of the machine tool.

An abnormality diagnosis apparatus is disclosed in Japanese Patent Application Laid-open No. 5-101245. Replacement history information on a component forming an abnormality diagnosis target device is input to and stored in the abnormality diagnosis apparatus in association with the number of the device. Component replacement information is estimated based on the replacement history information and already input and stored abnormality diagnosis data. The estimated component replacement information is output to and displayed on a display device.

The abnormality diagnosis apparatus can contribute to taking corrective measures after the abnormality diagnosis target device becomes abnormal. However, the abnormality diagnosis apparatus fails to diagnose reduced responsiveness resulting from degradation of the component as abnormality. The abnormality diagnosis apparatus fails to indicate an accurate maintenance time before the abnormality diagnosis target device becomes abnormal.

Furthermore, a monitoring diagnosis apparatus that diagnoses for the cause of abnormality is disclosed in Japanese Patent Application Laid-open No. 2011-243118. The monitoring diagnosis apparatus divides detection section data collected from a plurality of detection sections of a monitoring diagnosis target device into a plurality of status mode-based detection section data based on status mode transition points detected by a status mode transition point detection processing section. Moreover, the resultant status mode-based detection section data are classified into a plurality of groups. For each status mode and for each group, each of the detection data is compared with past statistical data to allow abnormality of the device to be detected. Then, for states before and after the detection of the abnormality, models for links among the detection section data and among the groups are constructed based on correlation coefficients for the detection section data for the respective status modes and the respective groups. Then, the cause of the abnormality is diagnosed based on the link model for the state before the detection of the abnormality and the link model for the state after the detection of the abnormality.

The monitoring diagnosis apparatus can efficiently and accurately analyze the complicated cause of occurrence of abnormality. However, the monitoring diagnosis apparatus fails to target reduced responsiveness resulting from degradation of the component for monitoring diagnosis. The monitoring diagnosis apparatus thus fails to inform the user of an accurate time for maintenance work before the abnormality diagnosis target device becomes abnormal.

SUMMARY OF THE INVENTION

Thus, an object of the present invention is to provide a machine tool in which a controller controlling the machine tool can provide an instruction for a certain operation and in which, after completion of the operation, the controller can receive a signal representing the completion of the operation from detection means provided in or outside the machine tool, wherein the machine tool is controlled by a numerical controller having a function to determine a replacement time for a maintenance component by monitoring the temporal transition of the response time of operation corresponding to the instruction for the operation and informing the user that the time has come to replace the maintenance component when the response time is longer than a preset time.

A machine tool according to the present invention is controlled by a numerical controller, and the numerical controller has a function to determine a replacement time for a maintenance component used in a movable portion of the machine tool and outputs to the machine tool an operation instruction for the movable portion. The machine tool includes an operation completion signal output unit that outputs, to the numerical controller, an operation completion signal indicating that the operation of the movable portion based on the operation instruction is complete. The numerical controller includes a response time calculation unit that calculates, as a response time of operation, a time from a point in time when the numerical controller outputs the operation instruction until a point in time when the numerical control device receives the operation completion signal from the operation completion signal output unit, a maintenance component replacement time determination unit that determines that a time has come to replace the maintenance component used in the movable portion when the calculated response time of operation is longer than a preset set time, and a display unit that displays a result of determination by the maintenance component replacement time determination unit.

The operation completion signal output unit may be provided outside the machine tool instead of being provided on the machine tool.

The numerical controller may further include a counter that counts a number of operations of the maintenance component used in the movable portion of the machine tool or an operation duration clocking unit that clocks a duration of operation of the maintenance component or a duration of operation of the machine tool. When displaying a result of determination by the maintenance component replacement time determination unit, the display unit may further display the number or duration of operations of the maintenance component.

In addition to the number or duration of operations of the component used in the movable portion of the machine tool or the duration of operations of the machine tool, the display unit may display an expected number of operations or expected duration of operations viable before a predetermined expected end of a life of the maintenance component arrives.

When the result of the determination by the maintenance component replacement time determination unit is displayed on the display unit, the display unit may display improvement information related to a usage method and a usage environment for the machine tool in order to allow an actual life of an component to be extended on the basis of the response time of operation.

A set time for determination of the replacement time for the maintenance component may be divided into a plurality of levels so that, during each of the time levels, a corresponding message is displayed on the display unit.

The present invention can provide a machine tool in which a controller controlling the machine tool can provide an instruction for a certain operation and in which, after completion of the operation, the controller can receive a signal representing the completion of the operation from detection means provided in or outside the machine tool, wherein the machine tool is controlled by a numerical controller having a function to determine a replacement time for a maintenance component by monitoring the temporal transition of the response time of operation corresponding to the instruction for the operation and informing the user that the time has come to replace the maintenance component when the response time is longer than a preset time.

BRIEF DESCRIPTION OF THE DRAWINGS

The forgoing and other objects and features of the invention will be apparent from the following description of preferred embodiments of the invention with reference to the accompanying drawings, in which:

FIG. 4 is a flowchart showing a third aspect of the process of determining the replacement time for the maintenance component which process is carried out by the numerical controller shown in FIG. 1;

FIG. 9 is a diagram showing a second example of the message displayed (informed) on the display device as a result of the determination process shown in FIG. 3;

FIG. 10 is a diagram showing a first example of a message displayed (informed) on the display device as a result of the determination process shown in FIG. 4;

FIG. 11 is a diagram showing a second example of the message displayed (informed) on the display device as a result of the determination process shown in FIG. 4; and FIG. 12A, FIG. 12B, and FIG. 12C are diagrams showing an example in which a set time allowing the replacement time for the maintenance component to be determined is divided into a plurality of levels so that, during each of the time levels, a corresponding message is displayed on the display device.

DETAILED DESCRIPTION OF THE PREFERRED EMBODIMENT

Figure 1:
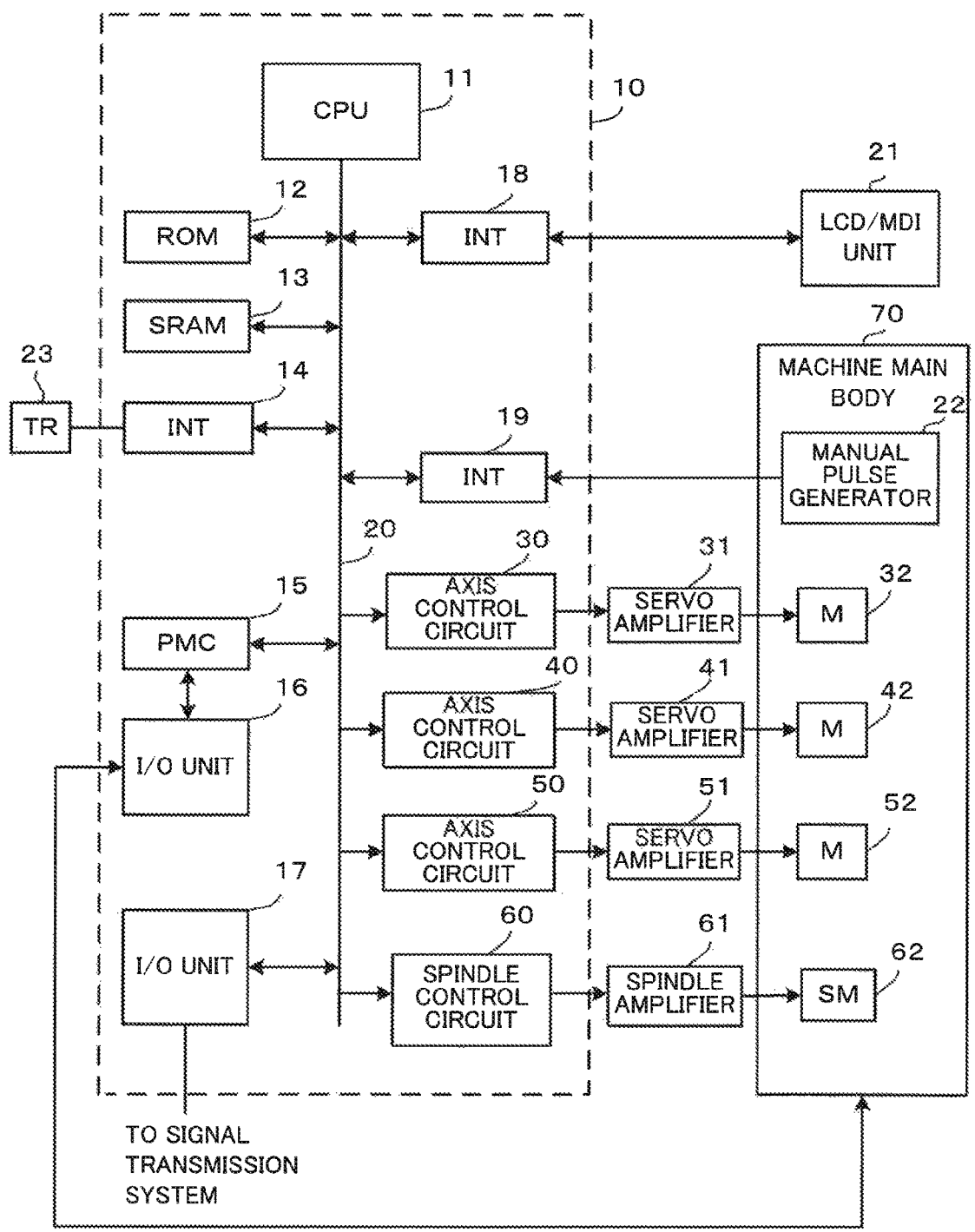
FIG. 1 is a block diagram illustrating an embodiment of a machine tool with a function to determine a replacement time for a maintenance component according to the present invention.

First, a method for determining a replacement time for a maintenance component according to the present invention will be described.

A machine tool according to the present invention is controlled by a controller. The controller provides an instruction for a certain operation, and after completion of the operation, receives a signal representing the completion of the operation from detection means provided in or outside the machine tool. The controller monitors the temporal transition of the response time of operation corresponding to the instruction for the operation and informs a user that the time has come to replace a maintenance component when the response time is longer than a preset time.

The controller for the machine tool calculates a difference between a point in time when the controller inputs the certain operation instruction signal to the machine tool and a point in time when the detection means provided in or outside the machine tool inputs a feedback signal representing the completion of the operation to the controller for the machine tool. This difference in time is referred to as the "response time of operation".

The "response time of operation" is the value of a time needed for signal processing in the machine tool plus the actual operating time of a mechanical component of the machine tool. In this case, the time needed for signal processing is approximately constant. On the other hand, the actual operating time of the mechanical component of the machine tool gradually increases from a value in an initial state as the mechanical component is degraded. For example, for an air cylinder widely used in machine tools as an actuator for a simple operation, the response time gradually increases from the value in the initial state as a seal component (an O ring or the like) of the air cylinder is worn away.

Monitoring a change in the "response time of operation" allows detection of a decrease in the responsiveness of the mechanical component of the machine tool, determination of degradation status of the mechanical component, and indication of an accurate time for component replacement or maintenance work based on the result of determination of the degradation status.

Here, an "expected life" refers to a life defined by the "number and duration of operations" performed by a monitoring target component until the monitoring target component reaches the end of life thereof, the "number and duration of operations" being determined by lifetime experiments carried out on the monitoring target component during mechanical design. On the other hand, an "actual life" refers to a life defined by the "response time of operation" of a mechanical component measured when the mechanical component reaches the end of life thereof, the "response time of operation" being determined by lifetime experiments carried out on the mechanism (mechanical component) during mechanical design.

The "expected life" is stored in advance in the controller for the machine tool. When the machine tool is operated and the "number and duration of operations" reach the values stored in the controller, the mechanical component is determined to have reached the end of life thereof. A method for determining the arrival of the "expected end of life" on the basis of the "number and duration of operations" fails to take a usage method and a usage environment into account. Thus, the determined life is constant regardless of the usage environment or aspect of the machine tool.

The "response time of operation" is also stored in the controller for the machine tool. When the machine tool is operated for a longtime and the responsiveness of the mechanism (mechanical component) gradually decreases to increase the response time of operation and when the response time of operation reaches the response time of operation stored in the controller for the machine tool, determination is made that the end of life for the mechanism (mechanical component) has arrived. The determination of arrival of the "actual end of life" based on the "response time of operation" is affected by the usage environment and aspect of the mechanical component. In a proper usage environment and a proper usage aspect of the mechanical component, the determined "actual life" is longer than the "expected life". In contrast, in an improper usage environment and an improper usage aspect of the mechanical component, the determined "actual life" is shorter than the "expected life". Thus, a more accurate life can be indicated according to the usage environment and method for the machine tool.

FIG. 1 is a block diagram illustrating an embodiment of a machine tool with a function to determine a replacement time for a mechanical component according to the present invention.

A numerical controller 10 controls a machine main body 70 of a machine tool or an industrial machine. A processor (CPU) 11 is a processor that generally controls the numerical controller 10. The CPU 11 reads a system program stored in ROM 12 via a bus 20, and generally controls the numerical controller 10 in accordance with the system program.

ROM 12 stores various system programs such as a program for processing in an edition mode needed to create and edit a machining program and a program for processing in a reproduction mode for automatic operation. ROM 12 also stores a program for detecting abnormality in the numerical controller 10 or in the machine main body 70 such as a machine tool or an industrial machine which is controlled by the numerical controller 10 and a transfer program for storing, when abnormality is detected, corresponding data in SRAM 13 and for transferring data from SRAM 13. The machine tool and the industrial machine are hereinafter collectively referred to as the "machine tool".

SRAM 13 is backed up by a battery (not shown in the drawings) to function as a nonvolatile memory and stores, in a data area, temporary calculation data and various data input by an operator via an LCD/MDI unit 21. Furthermore, SRAM 13 stores, for example, a machining program loaded therein via an interface 14 and a machining program input thereto via the LCD/MDI unit 21. The LCD/MDI unit 21 includes a liquid crystal display device and a manual input device such as a keyboard.

The interface 14 is intended for an external device that can be connected to the numerical controller 10, and connects to an external device 23 such as I/O means or an external storage device. The I/O means, the external storage device, or the like loads the machining program or the like into the numerical controller 10 via the interface 14. The machining program edited in the numerical controller 10 can be output to the I/O means, the external storage device, or the like via the interface 14.

A programmable machine controller (PMC) 15 controls auxiliary devices on the machine tool side, for example, an actuator for tool replacement, by means of sequence programs incorporated in the numerical controller 10. For example, in accordance with an M function, an S function, and a T function specified by the machining program, the PMC 15 converts the functions into signals needed for the auxiliary device side by means of the sequence programs. An I/O unit 16 outputs the signals to the auxiliary device side. The output signals actuate the auxiliary devices such as various actuators.

Image signals for the current positions of axes, alarms, parameters, image data, and the like are sent to the LCD/MDI unit 21 and displayed on a display of a liquid crystal display device in the LCD/MDI unit 21.

An interface 18 receives data from the keyboard of the LCD/MDI unit 21 and passes the data to the CPU 11. Furthermore, if an abnormality occurs in the numerical controller 10 or the machine controlled by the numerical controller 10, an alarm type and the cause of the alarm including additional information described below are displayed on a display screen of the LCD/MDI unit 21 to inform a user of the abnormality in the numerical controller 10 or the like. The display screen is used as informing means for providing information on the arrival of the replacement time for the maintenance component. Display examples shown in FIG. 9 to FIG. 12 are shown on the display screen.

An interface 19 is connected to a manual pulse generator 22 to receive a pulse from the manual pulse generator 22. The manual pulse generator 22 is mounted in an operation panel of the machine main body 70 and used to precisely position a movable portion of the machine tool by axis control in accordance with distributed pulses based on a manual operation.

Axis control circuits 30 to 50 receive movement instructions for respective axes from the CPU 11 and output the instructions for the respective axes to servo amplifiers 31 to 51. Upon receiving the instructions, the servo amplifiers 31 to 51 drive servo motors 32 to 52 for the respective axes in the machine tool. The servo motors 32 to 52 are used to drive linearly moving axes for table movement, that is, an X axis, a Y axis, and a Z axis.

The servo motors 32 to 52 for the respective axes have respective built-in position/velocity detectors (not shown in the drawings). Position data from the detectors are fed back to the axis control circuits 30 to 50. Differences between the position feedback data and the instruction values for the respective axes are determined to generate velocity data. In FIG. 1, description of the position feedback signals is omitted.

A spindle control circuit 60 receives a spindle rotation instruction transmitted from the CPU 11 to the machine tool, and outputs a spindle velocity instruction to a spindle amplifier 61. Upon receiving the spindle velocity instruction, the spindle amplifier 61 rotates a spindle motor 62 at a cutting rotation speed specified by the machine tool. A position detector is connected to the spindle motor 62 via a gear, a belt, or the like and outputs a feedback pulse in synchronism with rotation of the spindle. The feedback pulse is read by the CPU 11 via a bus 20. In FIG. 1, description of a configuration related to the feedback pulse is omitted. Furthermore, the bus 20 connects to an I/O unit 17 that transmits and receives signals to and from a signal transmission channel. A network and a telephone line are connected to the other side of the I/O unit 17.

With reference to flowcharts, description will be provided below which relates to several aspects of a process of determining the replacement time for the maintenance component which process is carried out by the numerical controller shown in FIG. 1.

Figure 2:
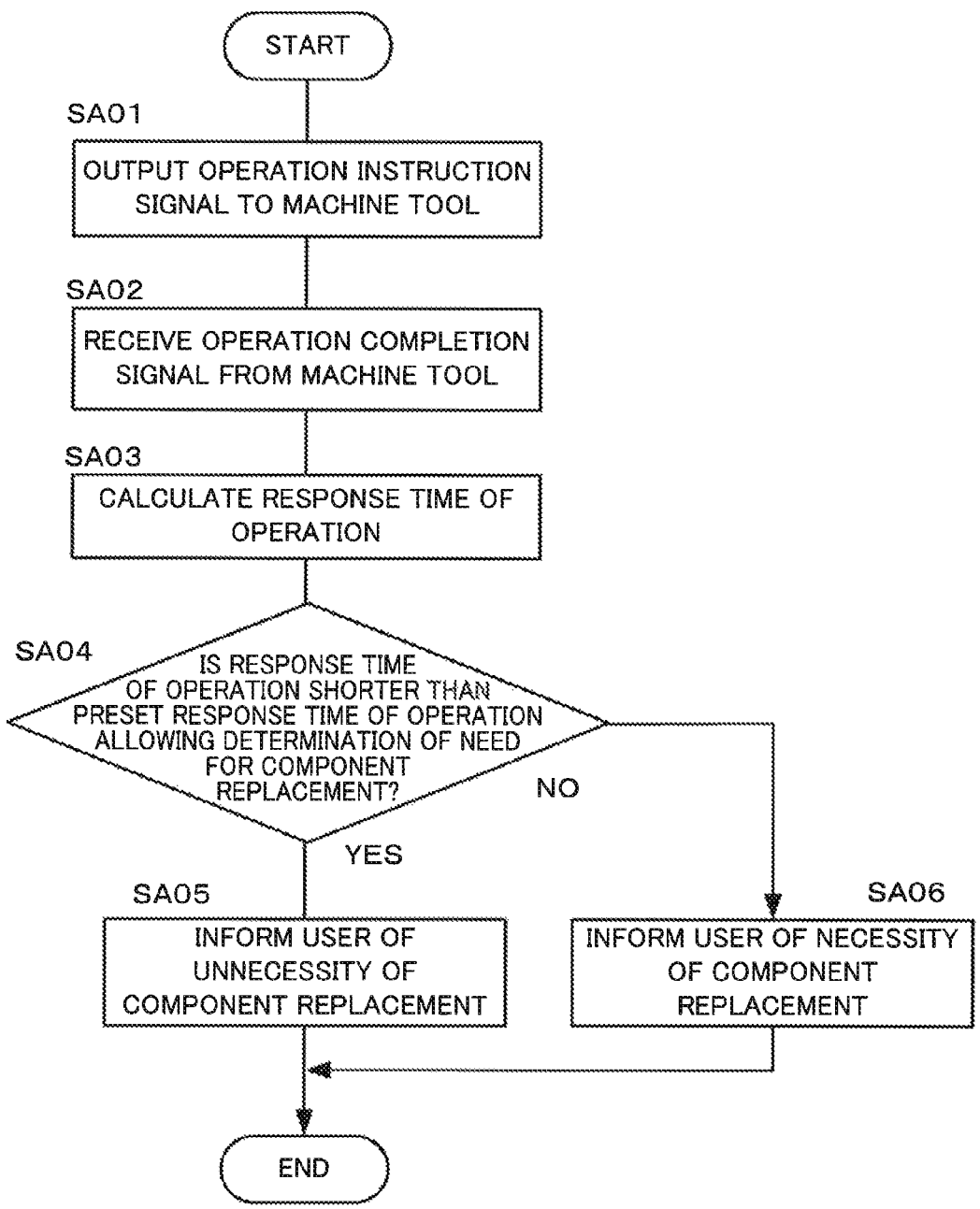
FIG. 2 is a flowchart showing a first aspect of a process of determining the replacement time for the maintenance component which process is carried out by a numerical controller shown in FIG. 1.

With reference to a flowchart in FIG. 2, description will be provided which relates to a first aspect of the process of determining the replacement time for the maintenance component which process is carried out by the numerical controller shown in FIG. 1.

The following description follows steps in the flowchart. A response time of operation which allows determination of the need for component replacement (that is, data indicative of an actual life) is set in advance in the numerical controller 10.

[Step SA01] The numerical controller 10 for the machine tool outputs an operation instruction signal to the machine tool (machine main body 70). In a specific example, the numerical controller 10 outputs, to the machine tool, a signal for operating the air cylinder provided in the machine tool.

[Step SA02] The machine tool transmits a feedback signal indicating that the operation specified in step SA01 is complete, to the numerical controller 10. On the other hand, the numerical controller 10 receives the feedback signal. The feedback signal is not limited to the feedback signal from the detection means provided in the machine tool but may be a feedback signal from the detection means provided outside the machine tool and detecting that the machine tool has started operation in accordance with the operation instruction signal from the numerical controller 10 and that the machine tool has completed the operation.

[Step SA03] The numerical controller 10 determines the response time of operation based on the difference between the point in time when the numerical controller 10 outputs the operation instruction signal to the machine tool in step SA01 and the point in time when the numerical controller 10 receives the feedback signal in step SA02.

[Step SA04] The numerical controller 10 determines whether or not the response time of operation determined in step SA03 is shorter than the preset response time of operation which allows determination of the need for component replacement (the actual end of life). If the result of the determination is affirmative (YES), the numerical controller 10 shifts to step SA05. If the result of the determination is negative (NO), the numerical controller 10 shifts to step SA06.

The replacement time for the maintenance component may be set to be determined at a plurality of points in time so that, at each set point in time, the display device of the numerical controller 10 displays a message allowing the user to recognize the replacement time for the maintenance component.

[Step SA05] The numerical controller 10 informs the user of the unnecessity of component replacement. For example, the numerical controller 10 shows the unnecessity of component replacement on the display device provided in the numerical controller 10. Then, the numerical controller ends the process. This step may be omitted.

[Step SA06] The numerical controller 10 informs the user of the necessity of component replacement. For example, the numerical controller 10 shows the necessity of component replacement on the display device provided in the numerical controller 10. Then, the numerical controller ends the process.

Figure 3:
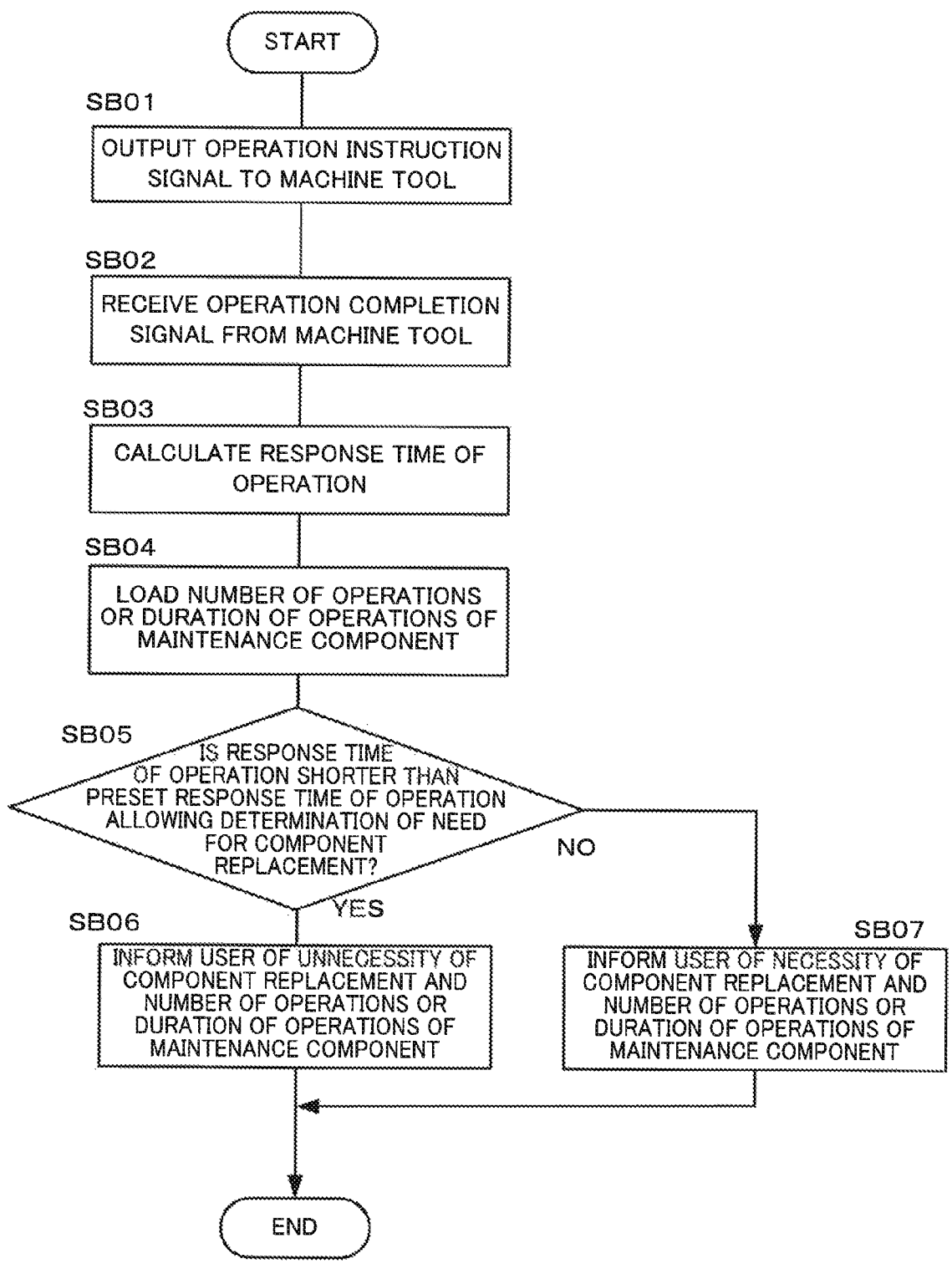
FIG. 3 is a flowchart showing a second aspect of the process of determining the replacement time for the maintenance component which process is carried out by the numerical controller shown in FIG. 1.

With reference to a flowchart in FIG. 3, description will be provided which relates to a second aspect of the process of determining the replacement time for the maintenance component which process is carried out by the numerical controller shown in FIG. 1.

The following description follows steps in the flowchart. A response time of operation which allows determination of the need for component replacement (that is, data indicative of an actual life) is set in advance in the numerical controller 10.

[Step SB01] The numerical controller 10 for the machine tool outputs an operation instruction signal to the machine tool (machine main body 70). In a specific example, the numerical controller 10 outputs, to the machine tool, a signal for operating the air cylinder provided in the machine tool.

[Step SB02] The machine tool transmits a feedback signal indicating that the operation specified in step SB01 is complete, to the numerical controller 10. On the other hand, the numerical controller 10 receives the feedback signal. The feedback signal is not limited to a feedback signal from the detection means provided in the machine tool but may be a feedback signal from the detection means provided outside the machine tool and detecting that the machine tool has started operation in accordance with the operation instruction signal from the numerical controller 10 and that the machine tool has completed the operation.

[Step SB03] The numerical controller 10 determines the response time of operation based on the difference between the point in time when the numerical controller 10 outputs the operation instruction signal to the machine tool in step SB01 and the point in time when the numerical controller 10 receives the feedback signal in step SB02.

[Step SB04] The numerical controller 10 carries out a process described with reference to FIG. 7 to load at least one of the current number and duration of operations of the maintenance component stored in the storage means of the numerical controller 10.

[Step SB05] The numerical controller 10 determines whether or not the response time of operation determined in step SB03 is shorter than the preset response time of operation which allows determination of the need for component replacement (the actual end of life). If the result of the determination is affirmative (YES), the numerical controller 10 shifts to step SB06. If the result of the determination is negative (NO), the numerical controller 10 shifts to step SB07.

[Step SB06] The numerical controller 10 informs the user of the unnecessity of component replacement and at least one of the current number and duration of operations of the maintenance component and then ends the process. For example, on the display device provided on the numerical controller 10, the numerical controller 10 displays the unnecessity of component replacement and at least one of the current number and duration of operations of the maintenance component, and then ends the process.

[Step SB07] The numerical controller 10 informs the user of the necessity of component replacement and at least one of the current number and duration of operations of the maintenance component and then ends the process. For example, on the display device provided on the numerical controller 10, the numerical controller 10 displays the necessity of component replacement and at least one of the current number and duration of operations of the maintenance component, and then ends the process.

With reference to a flowchart in FIG. 4, description will be provided which relates to a third aspect of the process of determining the replacement time for the maintenance component which process is carried out by the numerical controller shown in FIG. 1.

The following description follows steps in the flowchart. A response time of operation which allows determination of the need for component replacement (that is, data indicative of an actual life) is set in advance in the numerical controller 10.

[Step SC01] The numerical controller 10 for the machine tool outputs an operation instruction signal to the machine tool (machine main body 70). In a specific example, the numerical controller 10 outputs, to the machine tool, a signal for operating the air cylinder provided in the machine tool.

[Step SC02] The machine tool transmits a feedback signal indicating that the operation specified in step SC01 is complete, to the numerical controller 10. On the other hand, the numerical controller 10 receives the feedback signal. The feedback signal is not limited to a feedback signal from the detection means provided in the machine tool but may be a feedback signal from the detection means provided outside the machine tool and detecting that the machine tool has started operation in accordance with the operation instruction signal from the numerical controller 10 and that the machine tool has completed the operation.

[Step SC03] The numerical controller 10 determines the response time of operation based on the difference between the point in time when the numerical controller 10 outputs the operation instruction signal to the machine tool in step SC01 and the point in time when the numerical controller 10 receives the feedback signal in step SC02.

[Step SC04] The numerical controller 10 carries out a process described with reference to FIG. 7 to load at least one of the current number and duration of operations of the maintenance component stored in the storage means of the numerical controller 10.

[Step SC05] The numerical controller 10 loads at least one of the number and duration of operations of the maintenance component corresponding to the expected life and stored in advance in the storage device of the numerical controller 10.

[Step SC06] The numerical controller 10 determines whether or not the response time of operation determined in step SC03 is shorter than the preset response time of operation which allows determination of the need for component replacement (the actual end of life). If the result of the determination is affirmative (YES), the numerical controller 10 shifts to step SC07. If the result of the determination is negative (NO), the numerical controller 10 shifts to step SC08.

[Step SC07] The numerical controller 10 informs the user of the unnecessity of component replacement and at least one of the current number and duration of operations of the maintenance component. The numerical controller 10 further informs the user of at least one of the remaining number and duration of operations of the number and duration of operations of the maintenance component corresponding to the expected life. The numerical controller 10 then ends the process. For example, on the display device provided on the numerical controller 10, the numerical controller 10 displays the unnecessity of component replacement, at least one of the current number and duration of operations of the maintenance component, and at least one of the remaining number and duration of operations. The numerical controller 10 then ends the process.

[Step SC08] The numerical controller 10 informs the user of the necessity of component replacement and at least one of the current number and duration of operations of the maintenance component. The numerical controller 10 further informs the user of at least one of the remaining number and duration of operations of the number and duration of operations of the maintenance component corresponding to the expected life. The numerical controller 10 then ends the process. For example, on the display device provided on the numerical controller 10, the numerical controller 10 displays the necessity of component replacement, at least one of the current number and duration of operations of the maintenance component, and at least one of the remaining number and duration of operations. The numerical controller 10 then ends the process.

In step SC08, if the actual life is longer than the expected life, there is no remaining duration of operations, and thus, the "one of the remaining number and duration of operations" is changed to "one of the excess number and duration of operations compared to the expected life".

Figure 5A:
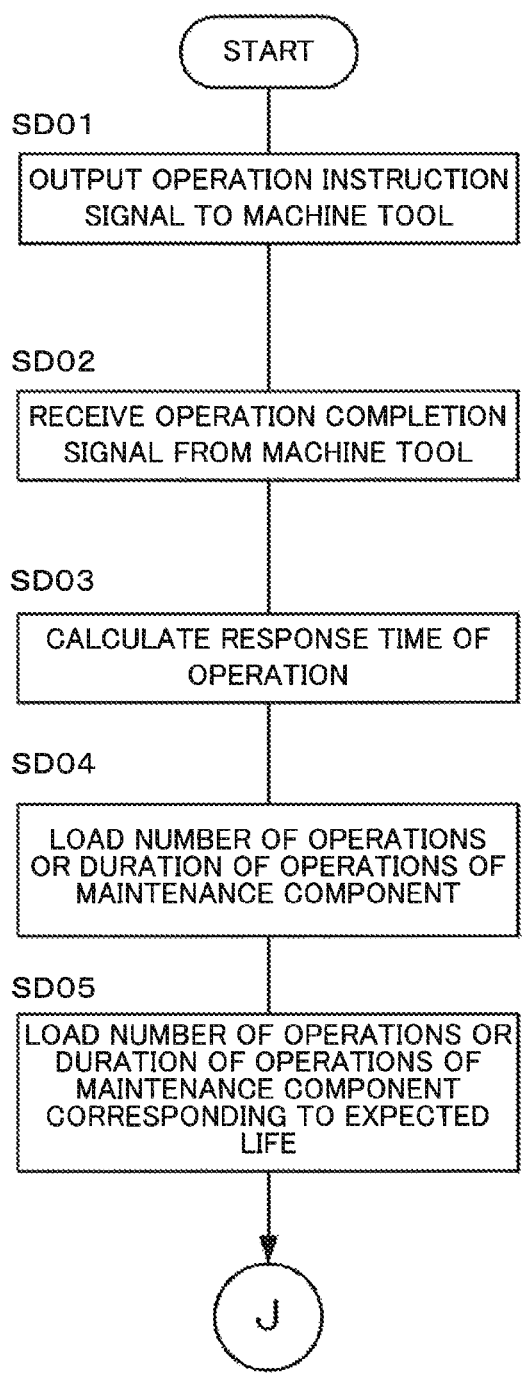
FIG. 5A and FIG. 5B are flowcharts showing a fourth aspect of the process of determining the replacement time for the maintenance component which process is carried out by the numerical controller shown in FIG. 1.
Figure 5B:
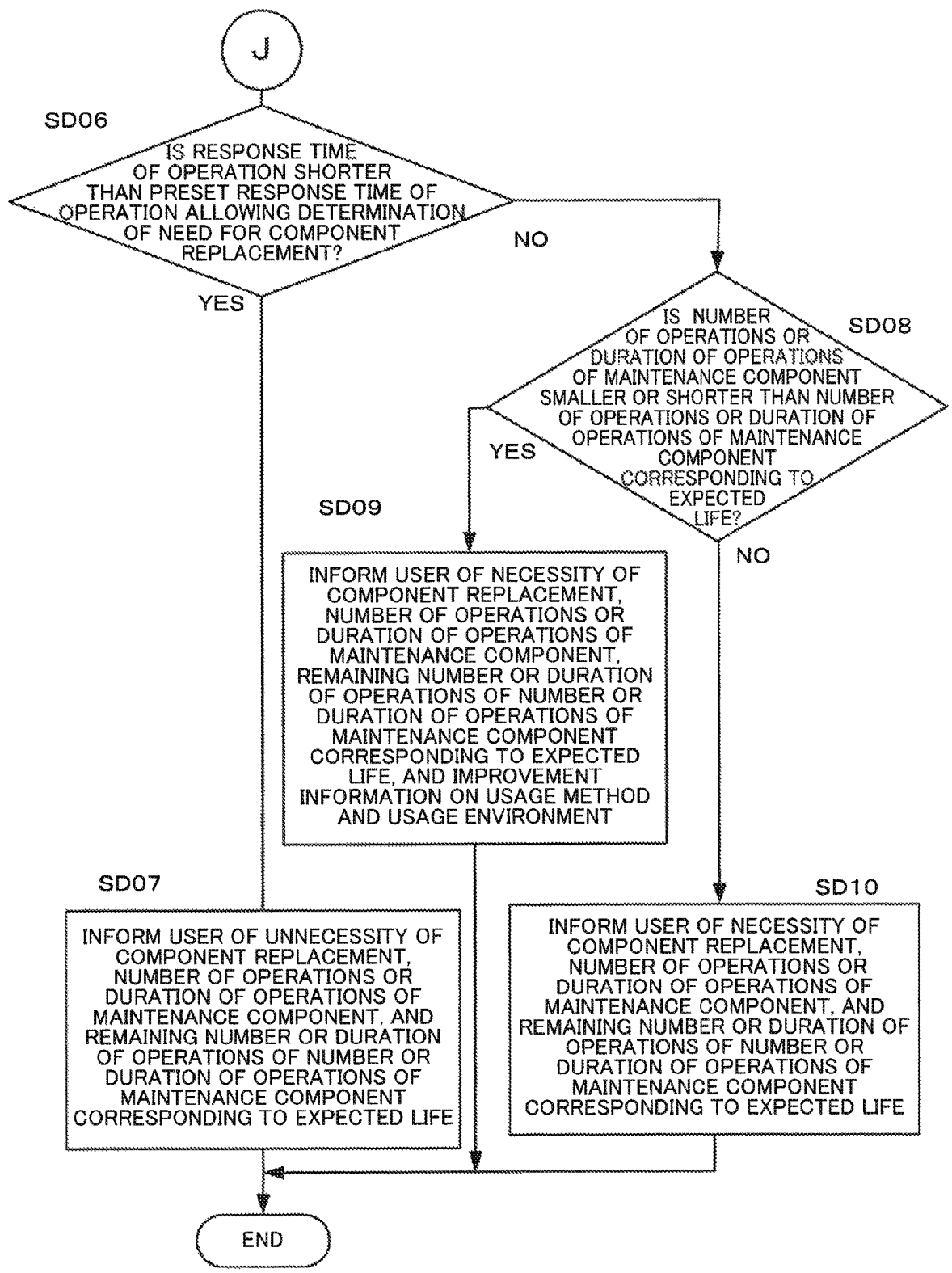

With reference to flowcharts in FIG. 5A and FIG. 5B, description will be provided which relates to a fourth aspect of the process of determining the replacement time for the maintenance component which process is carried out by the numerical controller shown in FIG. 1.

The following description follows steps in the flowcharts. A response time of operation which allows determination of the need for component replacement (that is, data indicative of an actual life) is set in advance in the numerical controller 10.

[Step SD01] The numerical controller 10 for the machine tool outputs an operation instruction signal to the machine tool (machine main body 70). In a specific example, the numerical controller 10 outputs, to the machine tool, a signal for operating the air cylinder provided in the machine tool.

[Step SD02] The machine tool transmits a feedback signal indicating that the operation specified in step SD01 is complete, to the numerical controller 10. On the other hand, the numerical controller 10 receives the feedback signal. The feedback signal is not limited to a feedback signal from the detection means provided in the machine tool but may be a feedback signal from the detection means provided outside the machine tool and detecting that the machine tool has started operation in accordance with the operation instruction signal from the numerical controller 10 and that the machine tool has completed the operation.

[Step SD03] The numerical controller 10 works out the response time of operation based on the difference between the point in time when the numerical controller 10 outputs the operation instruction signal to the machine tool in step SD01 and the point in time when the numerical controller 10 receives the feedback signal in step SD02.

[Step SD04] The numerical controller 10 carries out a process described with reference to FIG. 7 to load at least one of the current number and duration of operations of the maintenance component stored in the storage means of the numerical controller 10.

[Step SD05] The numerical controller 10 loads at least one of the number and duration of operations of the maintenance component corresponding to the expected life and stored in advance in the storage device of the numerical controller 10.

[Step SD06] The numerical controller 10 determines whether or not the response time of operation determined in step SD03 is shorter than the preset response time of operation which allows determination of the need for component replacement (the actual life). If the result of the determination is affirmative (YES), the numerical controller 10 shifts to step SD07. If the result of the determination is negative (NO), the numerical controller 10 shifts to step SD08.

[Step SD07] The numerical controller 10 informs the user of the unnecessity of component replacement and at least one of the current number and duration of operations of the maintenance component. The numerical controller 10 further informs the user of at least one of the remaining number and duration of operations of the number and duration of operations of the maintenance component corresponding to the expected life. The numerical controller 10 then ends the process. For example, on the display device provided on the numerical controller 10, the numerical controller 10 displays the unnecessity of component replacement, at least one of the current number and duration of operations of the maintenance component, and at least one of the remaining number and duration of operations. The numerical controller 10 then ends the process.

[Step SD08] The numerical controller 10 determines whether or not the current number or duration of operations loaded in step SD04 is smaller or shorter than the number or duration of operations of the maintenance component corresponding to the expected life. If the result of the determination is affirmative (YES), the numerical controller 10 shifts to step SD09. If the result of the determination is negative (NO), the numerical controller 10 shifts to step SD10.

[Step SD09] The numerical controller 10 informs the user of the necessity of component replacement and at least one of the current number and duration of operations of the maintenance component. The numerical controller 10 further informs the user of at least one of the remaining number and duration of operations of the number and duration of operations of the maintenance component corresponding to the expected life, and improvement information on a usage method and a usage environment for the machine tool (a portion that performs operations in accordance with operation instructions from the numerical controller 10) which information allows the actual life to be extended. The numerical controller 10 then ends the process. For example, on the display device provided on the numerical controller 10, the numerical controller 10 displays the necessity of component replacement, at least one of the current number and duration of operations of the maintenance component, at least one of the remaining number and duration of operations, and the improvement information on the usage method and the usage environment for the machine tool (the portion that performs operations in accordance with operation instructions from the numerical controller 10) which information allows the actual life (the number and duration of operations) to be extended. The numerical controller 10 then ends the process. The improvement information on the usage method and the usage environment is stored in advance in the storage device of the numerical controller 10 in association with each maintenance component.

[Step SD10] The numerical controller 10 informs the user of the necessity of component replacement and at least one of the current number and duration of operations of the maintenance component. The numerical controller 10 further informs the user of at least one of the remaining number and duration of operations of the number and duration of operations of the maintenance component corresponding to the expected life. The numerical controller 10 then ends the process. For example, on the display device provided on the numerical controller 10, the numerical controller 10 displays the necessity of component replacement, at least one of the current number and duration of operations of the maintenance component, and at least one of the remaining number and duration of operations. The numerical controller 10 then ends the process.

Figure 6:
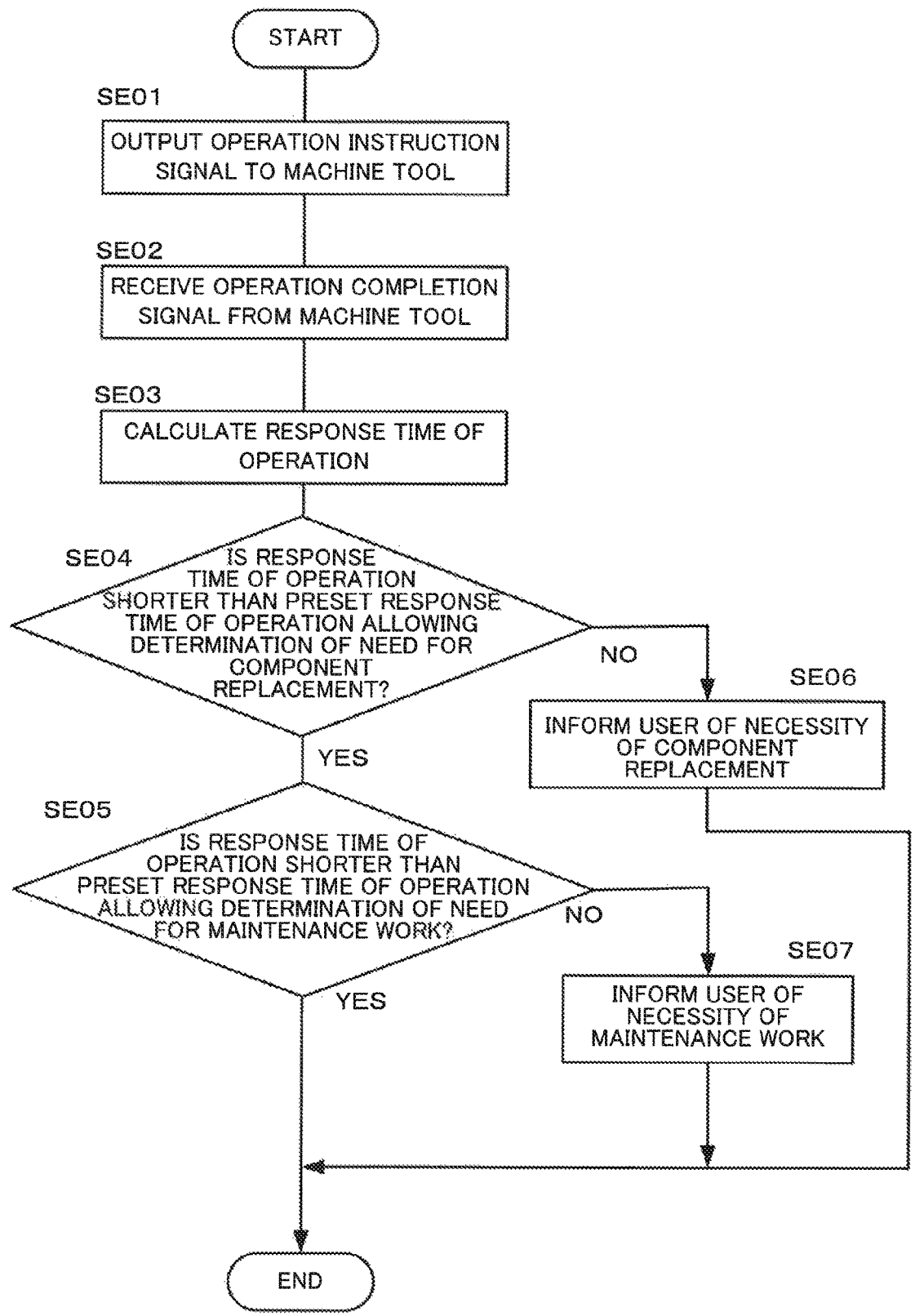
FIG. 6 is a flowchart showing an aspect of a process of informing a user of the replacement time for the maintenance component and also of a maintenance time for the maintenance component which process is carried out by the numerical controller shown in FIG. 1.

With reference to a flowchart in FIG. 6, description will be provided which relates to an aspect of a process of informing the user of the replacement time and maintenance time for the maintenance component which process is carried out by the numerical controller shown in FIG. 1.

The following description follows steps in the flowchart. Here, the "maintenance of the maintenance component" means, for example, cleaning of the maintenance component or replacement of a part of the maintenance component. Furthermore, a response time of operation which allows determination of the need for component replacement (that is, data indicative of an actual life) is set in advance in the numerical controller 10.

[Step SE01] The numerical controller 10 for the machine tool outputs an operation instruction signal to the machine tool (machine main body 70). In a specific example, the numerical controller 10 outputs, to the machine tool, a signal for operating the air cylinder provided in the machine tool.

[Step SE02] The machine tool transmits a feedback signal indicating that the operation specified in step SE01 is complete, to the numerical controller 10. On the other hand, the numerical controller 10 receives the feedback signal. The feedback signal is not limited to a feedback signal from the detection means provided in the machine tool but may be a feedback signal from the detection means provided outside the machine tool and detecting that the machine tool has started operation in accordance with the operation instruction signal from the numerical controller 10 and that the machine tool has completed the operation.

[Step SE03] The numerical controller 10 determines the response time of operation based on the difference between the point in time when the numerical controller 10 outputs the operation instruction signal to the machine tool in step SE01 and the point in time when the numerical controller 10 receives the feedback signal in step SE02.

[Step SE04] The numerical controller 10 determines whether or not the response time of operation determined in step SE03 is shorter than the preset response time of operation which allows determination of the need for component replacement (the actual end of life). If the result of the determination is affirmative (YES), the numerical controller 10 shifts to step SE05. If the result of the determination is negative (NO), the numerical controller 10 shifts to step SE06.

[Step SE05] The numerical controller 10 determines whether or not the response time of operation determined in step SE03 is shorter than the preset response time of operation which allows determination of the need for maintenance work. If the result of the determination is affirmative (YES), the numerical controller 10 ends the process. If the result of the determination is negative (NO), the numerical controller 10 shifts to step SB07.

[Step SE06] The numerical controller 10 informs the user of the necessity of component replacement. For example, the numerical controller 10 displays the necessity of component replacement on the display device provided in the numerical controller 10. The numerical controller 10 then ends the process.

[Step SE07] The numerical controller 10 informs the user of the necessity of maintenance work. For example, the numerical controller 10 displays the necessity of maintenance of the machine tool (maintenance component) on the display device provided in the numerical controller 10. The numerical controller 10 then ends the process.

In this aspect (the process shown in the flowchart in FIG. 6), the numerical controller 10 may determine the ratio between the response time of operation calculated in step SE03 and the preset response time of operation allowing determination of the necessity of component replacement or the preset response time of operation allowing determination of the necessity of component maintenance so that, when the ratio has a preset value, the numerical controller 10 can inform the user of an indication of the replacement time for the maintenance component or an indication of the maintenance time for the maintenance component. Alternatively, if the response time of operation fails to vary linearly, the numerical controller 10 may determine a predetermined ratio according to a curve. Furthermore, this aspect (the process shown in the flowchart in FIG. 6) is optimum for implementation at regular time intervals. That is, if the process shown in the flowchart in FIG. 6 is carried out at regular time intervals, it is possible to deal with a situation in which, instead of maintenance work, replacement of the maintenance component becomes necessary as a result of progressive degradation of the maintenance component during each of the regular time intervals.

Figure 7:
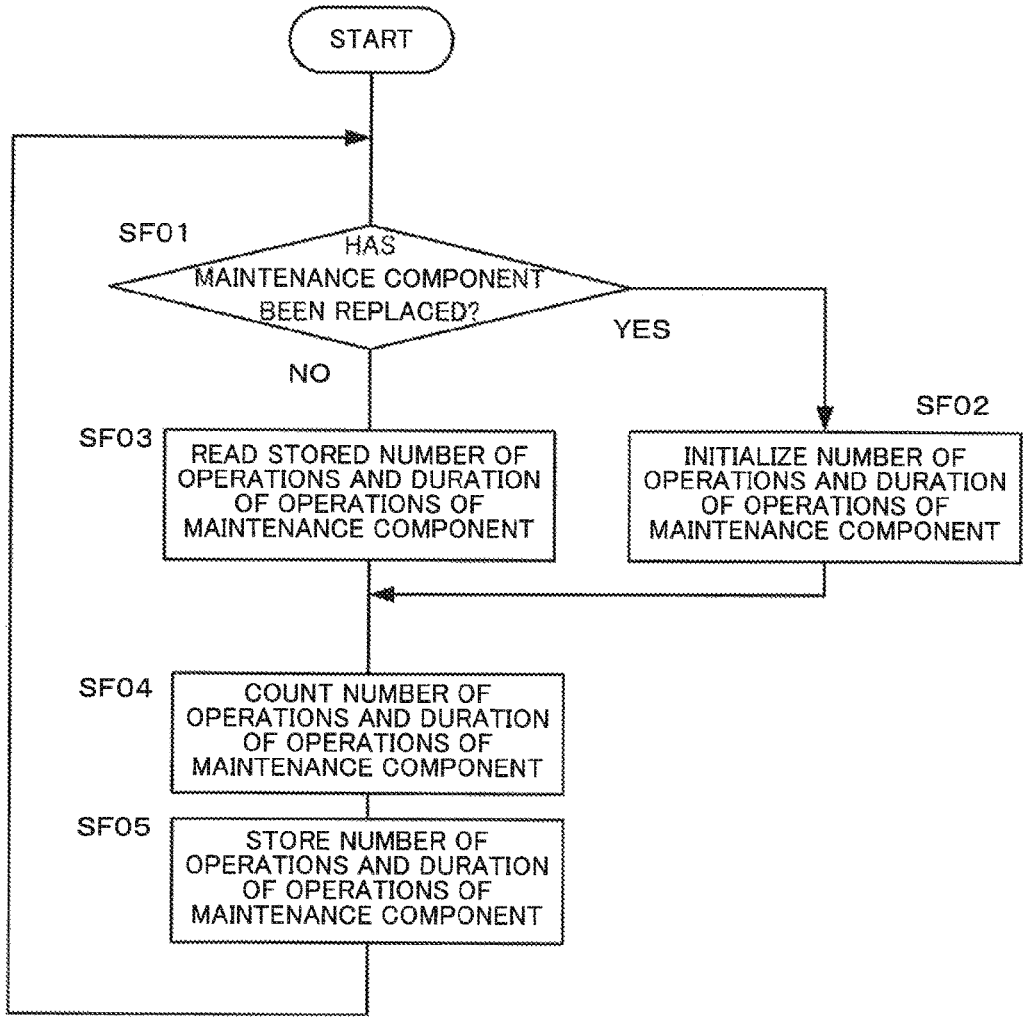
FIG. 7 is a flowchart illustrating the flow of a process of counting, when the maintenance component is to be replaced, the number and duration of operations of the maintenance component from the beginning of use to replacement of the maintenance component.

FIG. 7 is a flowchart illustrating the flow of a process of counting, when a maintenance component is to be replaced, the number and duration of operations from the beginning of use of the maintenance component until replacement of the maintenance component. Here, the number and duration of operations for the maintenance component is preset to initial values.

[Step SF01] The numerical controller 10 determines whether or not the maintenance component has been replaced. If the maintenance component has been replaced (YES), the numerical controller 10 shifts to step SF02. If the maintenance component has not been replaced yet (NO), the numerical controller 10 shifts to step SF03.

[Step SF02] The numerical controller 10 initializes the number and duration of operations of the maintenance component and then shifts to step SF04.

[Step SF03] The numerical controller 10 reads the current number and duration of operations of the maintenance component stored in the storage device of the numerical controller 10.

[Step SF04] The numerical controller 10 counts the number and duration of operations of the maintenance component. The number of operations is counted using a counter function of the numerical controller 10. Furthermore, the duration of operations is counted using a timer function of the numerical controller 10.

[Step SF05] The numerical controller 10 stores the values of the number and duration of operations of the maintenance component counted in step SF04 in the storage device of the numerical controller 10. The numerical controller 10 then returns to step SF01. The stored values of the number and duration of operations are loaded by the processing in step SB04 in the flowchart in FIG. 3, the processing in step SC04 in the flowchart in FIG. 4, and the processing in step SD04 in the flowchart in FIG. 5A.

Examples of messages displayed on the display screen of the display device of the numerical controller 10 will be described with reference to FIG. 8 to FIG. 12.

Figure 8:
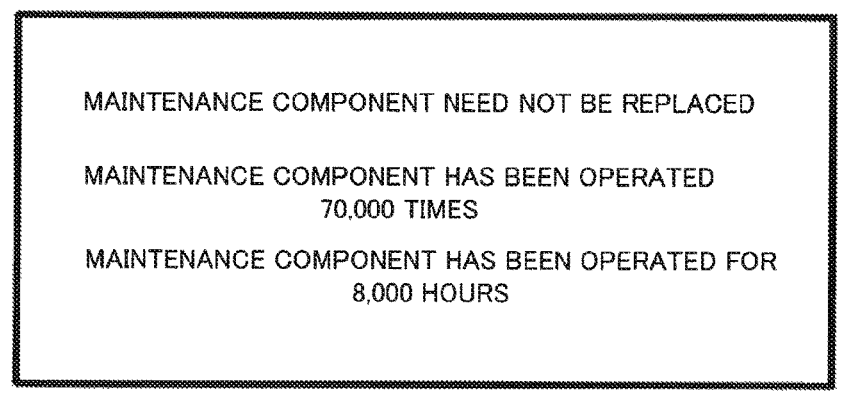
FIG. 8 is a diagram showing a first example of a message displayed (informed) on the display device as a result of the determination process shown in FIG. 3.

FIG. 8 shows an example of a message displayed on the display device by the informing operation in step SB06 in the flowchart in FIG. 3. FIG. 9 shows an example of a message displayed on the display device by the informing operation in step SB07 in the flowchart in FIG. 3. FIG. 10 shows an example of a message displayed on the display device by the informing operation in step SC07 in the flowchart in FIG. 4. FIG. 11 shows an example of a message displayed on the display device by the informing operation in step SC08 in the flowchart in FIG. 4.

FIG. 12A, FIG. 12B, and FIG. 12C show an example in which a set time for determining the replacement time for the maintenance component is divided into a plurality of levels and in which, during each of the time levels, a corresponding message is displayed on the display device of the numerical controller 10; FIG. 12A corresponds to a first level, FIG. 12B corresponds to a second level, and FIG. 12C corresponds to a third level. Thus, when, during each time level resulting from the division, the corresponding message is displayed on the display screen, an operator of the machine tool can determine the replacement time for the maintenance component on a step-by-step basis.

Now, a specific example of application of the present invention will be described.

An automatic door of the machine tool is driven by an air cylinder. The air cylinder and a rail for the automatic door are components degraded depending on how many times the air cylinder and the rail are used. Possible degradation of these components increases a time needed to open and close the door, affecting the cycle time of the machine tool.

The automatic door is opened and closed in the following manner.

(1) The controller for the machine tool outputs an operation signal to the air cylinder, which moves the door.

(2) The air cylinder, which moves the door, operates to move the door.

(3) The door opening or closing is implemented.

(4) The detection means (for example, a touch switch) for detecting that the door is opened or closed detects that the operation of opening or closing the door is complete. A detection signal output by the detection means is output via the machine tool to the controller for the machine tool as a feedback signal.

The life of the automatic door is conventionally determined based on how many times the automatic door is opened and closed and the duration of operations of the machine tool. This technique fails to take the usage environment of the machine tool into account and may thus fail to accurately determine the lives of components used for the automatic door. For example, when, in an environment in which the machine tool is installed, temperature varies sharply and a mist of cutting oil in a peripheral area is dense, the air cylinder of the automatic door has poor air tightness and the rail offers increased skid resistance. As a result, the automatic door operates at a reduced speed. When the cycle time is defined as a duration from the point in time when the controller for the machine tool outputs an operation instruction signal until the point in time when a feedback signal indicating that the operation is complete is input to the controller for the machine tool, the cycle time is increased by degradation of the air cylinder and the rail.

By monitoring the cycle time, the machine tool according to the present invention can more accurately determine that the component of the automatic door is degraded and indicate the necessity of maintenance work. During design of the automatic door, an expected life of a maintenance component to be monitored is stored in the controller for the machine tool, wherein the expected life corresponds to the number and duration of operations, measured in lifetime experiments, when the maintenance component reaches the end of the life thereof. Then, after shipment, operation of the machine tool also allows the maintenance component to operate based on an operation instruction from the controller. The number and duration of operations are counted by the controller for the machine tool. The numerical controller 10 has the count function and the timer function.

The duration of operations is measured by a timer in the controller. The duration of operations may be the duration of operations of each maintenance component or the duration of operations of the machine tool. The number of operations is counted by the counter in the controller for the machine tool based on the number of signals from a switch detecting that the door is opened and closed.

If the number or duration of operations measured when the component of the machine tool reaches the actual end of the life thereof is smaller or shorter than the expected life (the number or duration of operations) obtained by lifetime experiments, the numerical controller 10 for the machine tool indicates, to the user, information for improvement by means of the display device or the like, based on quality control data on defects stored in advance in the storage device of the numerical controller 10. For example, in the case of infiltration of the cutting oil, the numerical controller 10 indicates, to the user, the need to check a cover of the machine tool for sealability. Furthermore, in the case of wear of the rail, the numerical controller indicates, to the user, the need to improve a lubrication environment by, for example, a method of adding grease to the rail.

In order to suppress the adverse effect of an increase in cycle time caused by degradation of the maintenance component even though the maintenance component has not reached the end of the life thereof yet, the user may set a limit on a decrease in responsiveness so that, when this limit value is exceeded, the numerical controller can indicate, to the user, the need for maintenance work or component replacement. For example, in the above-described example of the automatic door, whereas the initial cycle time is 1 second, the cycle time measured when the maintenance component reaches the end of the life thereof is 12 seconds. Thus, in order to suppress the adverse effect of an increase in cycle time, the user may set a lower limit on responsiveness to 5 seconds so that the component can be maintained regardless of the actual life of the component.

The present invention is often applied to management of the replacement time for a maintenance component used in a movable portion driven by a certain constant driving force, as described above. However, the present invention enables management of the replacement time for a maintenance component used in a movable portion driven by a varying driving force. In this case, for example, the numerical controller 10 outputs an operation instruction signal for driving by a certain constant driving force to the machine main body 70. This enables the response time to be measured under the constant condition, allowing the present invention to be applied to the machine tool.

What is claimed is:

1. A machine tool controlled by a numerical controller, wherein
    the numerical controller has a function to determine a replacement time for a maintenance component used in a movable portion of the machine tool and outputting to the machine tool an operation instruction related to the movable portion,
    an operation completion signal output unit is provided outside the machine tool and outputs, to the numerical controller, an operation completion signal indicating that the operation of the movable portion based on the operation instruction is complete,
    the numerical controller includes:
        a response time calculation unit that calculates, as a response time of operation, a time from a point in time when the numerical controller outputs the operation instruction until a point in time when the numerical control device receives the operation completion signal from the operation completion signal output unit;
        a maintenance component replacement time determination unit that determines that a time has come to replace the maintenance component used in the movable portion when the calculated response time of operation is longer than a preset set time;
        a display unit that displays a result of determination by the maintenance component replacement time determination unit; and
        a counter that counts a number of operations of the maintenance component used in the movable portion of the machine tool or an operation duration clocking unit that clocks a duration of operation of the maintenance component or a duration of operation of the machine tool,
    the display unit further displays, when displaying a result of determination by the maintenance component replacement time determination unit, the number or duration of operations of the maintenance component, and
    the response time of operation is a sum of time needed for signal processing in the machine tool plus an actual operating time of a mechanical component of the machine tool.

2. A machine tool controlled by a numerical controller, wherein
    the numerical controller has a function to determine a replacement time for a maintenance component used in a movable portion of the machine tool and outputting to the machine tool an operation instruction related to the movable portion, the machine tool has an operation completion signal output unit that outputs, to the numerical controller, an operation completion signal indicating that the operation of the movable portion based on the operation instruction is complete, the numerical controller includes:
- a response time calculation unit that calculates, as a response time of operation, a time from a point in time when the numerical controller outputs the operation instruction until a point in time when the numerical control device receives the operation completion signal from the operation completion signal output unit;
- a maintenance component replacement time determination unit that determines that a time has come to replace the maintenance component used in the movable portion when the calculated response time of operation is longer than a preset set time;
- a display unit that displays a result of determination by the maintenance component replacement time determination unit; and
- a counter that counts a number of operations of the maintenance component used in the movable portion of the machine tool or an operation duration clocking unit that clocks a duration of operation of the maintenance component or a duration of operation of the machine tool, the display unit further displays, when displaying a result of determination by the maintenance component replacement time determination unit, the number or duration of operations of the maintenance component, and the response time of operation is a sum of time needed for signal processing in the machine tool plus an actual operating time of a mechanical component of the machine tool.

3. The machine tool according to claim 2, wherein, in addition to the number or duration of operations of the component used in the movable portion of the machine tool or the duration of operations of the machine tool, the display unit displays an expected number of operations or expected duration of operations viable before a predetermined expected end of a life of the maintenance component arrives.

4. The machine tool according to claim 2, wherein, when the result of the determination by the maintenance component replacement time determination unit is displayed on the display unit, the display unit displays improvement information related to a usage method and a usage environment for the machine tool in order to allow an actual life of an component to be extended on the basis of the response time of operation.

5. The machine tool according to claim 2, wherein a set time for determination of a replacement time for the maintenance component is divided into a plurality of levels so that, during each of the time levels, a corresponding message is displayed on the display unit.

6. The machine tool according to claim 2, wherein the time needed for signal processing is constant.

7. The machine tool according to claim 6, wherein the actual operating time of the mechanical component of the machine tool gradually increases from an initial value as the mechanical component is degraded.

* * * * *